United States Patent [19]
Kaneko et al.

[11] Patent Number: 5,808,214
[45] Date of Patent: Sep. 15, 1998

[54] POWDER-PRODUCED MATERIAL HAVING WEAR-RESISTANCE

[75] Inventors: Tadataka Kaneko, Nagoya; Setsuto Daiza, Toyota; Takehiko Esumi, Kyoto, all of Japan

[73] Assignees: Toyota Jidosha Kabushiki Kaisha, Toyota; Japan Powder Metallurgy Co., Ltd., Tokyo, both of Japan

[21] Appl. No.: 819,940

[22] Filed: Mar. 18, 1997

[30] Foreign Application Priority Data

Mar. 21, 1996 [JP] Japan .................................. 8-064494

[51] Int. Cl.$^6$ ...................................................... C22C 33/02
[52] U.S. Cl. ................................ 75/246; 75/231; 75/241
[58] Field of Search ............................... 75/231, 241, 246

[56] References Cited

U.S. PATENT DOCUMENTS

| | | |
|---|---|---|
| 3,830,280 | 8/1974 | Larsen . |
| 3,982,905 | 9/1976 | Osawa et al. . |
| 3,982,907 | 9/1976 | Honma . |
| 4,505,988 | 3/1985 | Urano et al. .............................. 428/569 |
| 4,715,972 | 12/1987 | Pacholke .................................... 252/25 |
| 5,034,187 | 7/1991 | Sliney et al. .............................. 419/14 |
| 5,489,324 | 2/1996 | Takahasi et al. .......................... 75/246 |

FOREIGN PATENT DOCUMENTS

| | | |
|---|---|---|
| 60-224762 | 9/1985 | Japan . |
| 62-202058 | 5/1987 | Japan . |

*Primary Examiner*—Ngoclan Mai
*Attorney, Agent, or Firm*—Burns, Doane, Swecker & Mathis, LLP

[57] ABSTRACT

Since a powder-produced material comprises cerium fluoride, it can exhibit good wear-resistance. The cerium fluoride content may be set in the range of from 0.1 to 22% by weight, in particular, in the range of from 0.1 to 10.0% by weight, based on the total weight of the powder-produced material. The powder-produced material may comprise a ferrous matrix including hard particles, and the ferrous matrix includes cerium fluoride.

11 Claims, 1 Drawing Sheet

POWDER-PRODUCED MATERIAL HAVING WEAR-RESISTANCE

BACKGROUND OF THE INVENTION

1. Field of the Invention

This invention relates to a powder-produced material having wear-resistance. The powder-produced material means a material which is produced by use of powder. The present invention can be applied to sintered materials constituting apparatuses and parts requiring wear-resistance. The present invention can be applied to, for example, sliding material members such as valve seats and valve guides which are utilized in internal-combustions of vehicles.

2. Description of the Related Art

The related art concerning a powder-produced material having wear-resistance will be hereinafter described by taking a sintered material being used in valve seats of internal-combustions as an example. Japanese Unexamined Patent Publication (KOKAI) No. 60-224,762 discloses a sintered alloy in which hard particles (average particle diameter: from 40 to 150 micrometers), having a Hardness of Hv 300–700 and including carbides less than 10 micrometers constituted from Cr, Mo, V, and so on, are dispersed in a Fe-C alloy matrix having mainly a pearlite structure including Cr and Mo so as to improve wear-resistance and mate-attacking property. This sintered alloy is used for valve seats of internal-combustions.

Moreover, Japanese Unexamined Patent Publication (KOKAI) 62-202,058 discloses another sintered alloy in which hard particles constituted from FeMo and FeW are dispersed in a Fe-Co-Ni-C based matrix for producing a sintered body, and molten metal comprising Pb alloy and so on is impregnated into pores of the sintered body in such a manner that wear-resistance thereof is improved. It is thought that Pb alloy is available for increasing lubricating ability. This sintered alloy is also used for the aforementioned valve seats.

In the field of the powder-produced material, the further improvement has recently been required in wear-resistance. Also, in the field of the sintered material such as the aforementioned valve seats, the further improvement has been required in wear-resistance.

SUMMARY OF THE INVENTION

The present invention has been developed in view of the above-mentioned circumstances. It is a primary object of the present invention to provide a powder-produced material in which wear-resistance is advantageously improved.

The present inventors have earnestly been developed a powder-produced material in view of the above circumstances, they have been found and confirmed in tests that an addition of cerium fluoride improves wear-resistance, and they have been completed the present invention. The reason why wear-resistance is improved isn't considerably clear. It is thought that cerium fluoride improves lubricating ability of the powder-produced material.

According to a first aspect (aspect 1) of the present invention, a powder-produced material having wear-resistance is characterized in that: it comprises cerium fluoride.

According to a second aspect (aspect 2) of the present invention, a powder-produced material is characterized in that: it comprises cerium fluoride in the range of from 0.1 to 10.0% by weight, based on the total weight of the powder-produced material.

According to a third aspect (aspect 3) of the present invention, a powder-produced material is characterized in that it comprises:
a ferrous matrix including hard particles;
wherein the ferrous matrix includes cerium fluoride.

According to a fourth aspect (aspect 4) of the present invention, the powder-produced material includes 1.4 to 15% by weight of cobalt(Co), 1.3 to 16% by weight of molybdenum(Mo), 0.4 to 12% by weight of chromium(Cr), 0.2 to 6% by weight of tungsten(W), 0.4 to 3.2 by weight of carbon(C), 0.2 to 9% by weight of nickel(Ni), 0.1 to 10.0% by weight of cerium fluoride ($CeF_3$), inevitable impurities, and the balance substantially of iron(Fe), based on the total weight of the powder-produced material;

the ferrous matrix includes 2 to 15% by weight of cobalt(Co), 2 to 10% by weight of molybdenum(Mo), 0.2 to 2% by weight of carbon(C), 10% or below by weight of nickel(Ni), inevitable impurities, and the balance substantially of iron(Fe), based on the total weight of the ferrous matrix;

the hard particles are Ni-based hard particles, the Ni-based hard particles include 5 to 20% by weight of molybdenum(Mo), 20 to 50% by weight of chromium(Cr), 10 to 25% by weight of tungsten(W), 0.5 to 5% by weight of carbon(C), 5 to 40% by weight of iron, inevitable impurities, and the balance substantially of nickel(Ni).

According to the first aspect of the present invention, the powder-produced material has wear-resistance advantageously to be applicable to sliding members. Especially, the powder-produced material is applicable to sliding members for being slidden in high-temperature such as valve seats and valve guides in internal-combustions. As a matter of course, the powder-produced material is applicable to sliding members for being slidden in normal-temperature and in low-temperature.

According to the second aspect of the present invention, since the powder-produced material is restricted in the amount of cerium fluoride, the powder-produced material is advantageous in wear-resistance with costs thereof reducing.

According to the third aspect of the present invention, since the powder-produced material includes Ni-based hard particles and cerium fluoride being dispersed in the ferrous matrix, the powder-produced material has wear-resistance advantageously.

According to the fourth aspect of the present invention, the powder-produced material is restricted in the composition thereof, in the cerium fluoride content, in the composition of the ferrous matrix, and in the composition of the Ni-based hard particles; therefore, the powder-produced material has not only wear-resistance but also oxidation-resistance and corrosion-resistance in the ferrous matrix.

According to the fourth aspect of the present invention, since the composition of the powder-produced material is restricted, oxidation-resistance and corrosion-resistance can be expected advantageously. Especially, even when the powder-produced material is utilized as sliding members for being slidden at high temperature such as valve seats and valve guides in internal-combustions, oxidation-resistance and corrosion-resistance can be expected advantageously.

Various appearances of the present invention will be hereinafter described. The powder-produced material of the present invention is generally applicable to a sintered material such as a sintered alloy body combined by use of sintering treatment. The powder-produced material is sometimes applicable to pressed compact bodies in which powder-particles are combined with binders such as resinous binders.

The representative matrix in the powder-produced material of the present invention may be a ferrous matrix. However, the representative matrix isn't limited to the ferrous matrix. As for use of the powder-produced material of the present invention, for example, sliding members may be suitable, especially, sliding members for being slidden in high-temperature, such as valve seats and valve guides in internal-combustions.

Cerium fluoride contributes to improvement in wear-resistance. According to a reference, cerium fluoride has a trigonal crystal structure and a melting point of 1460° C. It is thought that cerium fluoride has a flocculent configuration in which extremely minute pieces, extremely minute particles and the like gather under observation by use of an electron microscope.

According to experiments carried out by the present inventors on the sintered material representing the powder-produced material, even when the cerium fluoride content increases, obstruction isn't substantially in existence with respect to the carbon-diffusion during the sintering treatment, or the obstruction is only slightly.

According to the powder-produced material of the present invention, in view of both of wear-resistance and costs, the cerium fluoride content is preferable in the range of from 0.1 to 10.0% by weight. A addition of cerium fluoride can improve wear-resistance even in case of 0.1% or below.

In the case where the cerium fluoride content is 0.1% and more, wear-resistance targeted by the present inventors can be obtained; therefore, the lower limit of cerium fluoride can be set at 0.3%, 0.5%, 1%, 2%, or 5% depending on use of the powder-produced material. In the case where the cerium fluoride content is 10% and more, although wear-resistance is improved, the costs of powder-produced material is expensive to be disadvantageous. Accordingly, the cerium fluoride content is preferable in the range of from 0.1 to 10%. Particularly, the upper limit of the cerium fluoride content can be set at 3%, 5%, or 7%. The cerium fluoride content can be set more than 10% in the case where the further wear-resistance is required in spite of the fact that costs is disadvantageous. Thus, the upper limit of the cerium fluoride can be set, for example, at 16% or 21%, based on the total of the powder-produced material, in parts or apparatuses in which cost is substantially ignorable.

According to the powder-produced material of the present invention, hard particles may be dispersed in the matrix for improving wear-resistance further. The hard particles may be hard than the matrix. However, over-hardness of the hard particles brings attacking a mating member. In this respect, as for the hardness of hard particles, the lower limit can be set at Hv400, Hv500, or Hv600, and the upper limit can be set at Hv900, Hv1000, Hv1200, or Hv1700. The hard particles can function as pavement effect hardening material-hardness partially in the matrix. Thus, as for the average particle-diameter of hard particles, the lower limit can be set at 30 micrometers, 40 micrometers, or 50 micrometers in response to use of powder-produced material, and the upper limit can be set at 60 micrometers, 80 micrometers, or 100 micrometers.

Based on the total weight of the powder-produced material, the hard particles may fall in the range of from 2 to 30% by weight, particularly in the range of from 3 to 25% by weight, in response to the kind of hard particles.

The hard particles may be selected from the group including hard metallic particles, intermetallic compound particles, ceramic particles, and the like. For example, the hard particles may be selected from the group including Ni-based, hard particles, FeCr particles, FeMo particles, FeW particles, mullite particles, high-speed steel particles, tool steel particles, and the like.

The states of ferrous powder-produced material, representing the powder-produced material of the present invention, will be hereinafter described. The ferrous powder-produced material may be selected from the composition including 1.4 to 15% by weight of cobalt(Co), 1.5 to 16% by weight of molybdenum(Mo), 0.4 to 12% by weight of chromium(Cr), 0.2 to 6% by weight of tungsten (W), 0.4 to 3.2% by weight of carbon(C), 0.2 to 9% by weight of nickel(Ni), 0.1 to 10.0% by weight of cerium fluoride($CeF_3$), inevitable impurities, and the balance substantially of iron(Fe), based on the total weight of the powder-produced material. This composition is suitable for sliding members such as valve seats.

Carbon(C) is dissolved in the matrix owing to heat during the sintering treatment to strengthen the matrix. A part of carbon(C) is diffused into Ni-based hard particles to increase the hardness of Ni-based hard particles further and to improve wear-resistance. From these viewpoints, as described above, carbon(C) may be set in the range of from 0.4 to 3.2%.

Concerning the composition of powder-produced material, the reason why Co, Mo, Cr, W, and the like are restricted in the composition is similar to the restricted reason described later with respect to the composition of the ferrous matrix and the Ni-based hard particles.

The aforementioned ferrous powder-produced material may be set in the state where Ni-based hard particle and cerium fluoride ($CeF_3$) are dispersed in a ferrous matrix. The ferrous matrix may be set in the composition where 2 to 15% by weight of cobalt(Co), 2 to 10% by weight of molybdenum(Mo), 0.2 to 2% by weight of carbon(C), 10% and below by weight of nickel(Ni), inevitable impurities, and the balance substantially of iron(Fe), based on the total weight of the ferrous matrix. Such compositions can advantageously produce Ni-rich austenite.

The reason why the composition is restricted in the ferrous matrix is as follows: Cobalt(Co) is dissolved in the ferrous matrix to strengthen the ferrous matrix and to increase heat-resistance of the ferrous matrix. The ferrous matrix hasn't an improved and enough effect in the case where cobalt(Co) is 2% or below; the ferrous matrix has an improved effect in spite of the fact that cost is expensive in the case where cobalt(Co) is more than 15%. Therefore, in view of the above circumstances, the cobalt(Co) content in the ferrous matrix is preferable in the range of from 2 to 15%. As for the cobalt(Co) content of the ferrous matrix, the lower limit may be set at 2% or 4%, and the upper limit may be set at 8% or 11%, in response to use.

Molybdenum(Mo) is dissolved in the ferrous matrix to strengthen the ferrous matrix and to increase strength and corrosion-resistance of the ferrous matrix in high temperature. A part of molybdenum(Mo) generates molybdenum-carbide to improve wear-resistance. In the case where molybdenum(Mo) is 2% or below, the ferrous matrix hasn't an improved and enough effect in wear-resistance. In the case where molybdenum(Mo) is more than 3%, the ferrous matrix has a stabilized effect in wear-resistance but has a reduced compressibility. Therefore, in view of the above circumstances, the molybdenum(Mo) content in the ferrous matrix is preferably in the range of from 2 to 10%, and more preferably in the range of from 3 to 10%. As for the molybdenum(Mo) content of the ferrous matrix, the lower limit may be set at 2% or 4%, and the upper limit may be set at 6% or 8%.

Nickel(Ni) contributes to generation of Ni-rich austenite in the ferrous matrix; so, Nickel(Ni) may be set at the aforementioned content.

In the above-mentioned powder-produced material, Ni-based hard particles are dispersed in the ferrous matrix. Ni-based hard particles may include 5 to 20% by weight of molybdenum(Mo), 20 to 50% by weight of chromium(Cr), 10 to 25% by weight of tungsten(W), 0.5 to 5% by weight of carbon(C), 5 to 40% by weight of iron(Fe), inevitable impurities, and the balance substantially of nickel(Ni), based on the total of the Ni-based hard particles. The Ni-based hard particles may include less than 2% Si by weight as occasion demands.

The restricted reason in the composition of the Ni-based hard particles will be hereinafter described. Mo, Cr, W, Fe, Si in the Ni-based hard particles are combined with carbon (C) to produce carbides, which can contribute to improvement in wear-resistance.

A part of both of Ni and Fe in the Ni-based hard particles is diffused into the ferrous matrix owing to heat during the sintering treatment to contribute generation of Ni-rich austenite. This improves oxidation-resistance of the matrix and contributes to improvement of holding force by which the matrix holds the Ni-based hard particles.

As described above, in the case where the composition of powder-produced material, the composition of ferrous matrix, and the composition of Ni-based hard particles are restricted, oxidation-resistance and corrosion-resistance may be improved in addition to wear-resistance. Even when the powder-produced material of the present invention is utilized as sliding members being slidden at high temperature such as valve seats and valve guides, oxidation-resistance and corrosion-resistance are improved in addition to wear-resistance.

The powder-produced material of the present invention may be produced as follows: Fe-based alloy powder constituting the ferrous matrix, hard alloy powder constituting the Ni-based hard particles, graphite powder, cerium fluoride powder, a reasonable lubricant are utilized. Firstly, in a mixing step, these powders are mixed to produce a mixed powder. In the mixing step, it is preferable to disperse these powders uniformly if possible.

Next, in a pressing step, the mixed powder is pressed in dies to produce a pressed compact body. Further, in a sintering step, the pressed compact body is heated in a sintering temperature region to produce a sintered material body. The sintering temperature may be set in response to the composition thereof. For example, the lower limit of the sintering temperature may be selected in the range of from 1323K to less than the melting point of the hard alloy powder; the upper limit may be selected at 1393K, or 1423K. A atmosphere is preferably a non-oxidizing atmosphere such as a nitrogen gas atmosphere, or an inert gas atmosphere.

The mixed powder includes 2 to 30% by weight of the hard alloy powder, 0.2 to 2% by weight of the graphite powder, 0.1 to 10.0% by weight of the cerium fluoride powder, and the balance substantially of the Fe-based alloy powder. In the mixed powder, when the hard alloy powder is less than 2%, wear-resistance is restricted; when the hard alloy powder is more than 30%, improvement in wear-resistance isn't enough and compactibility thereof is decreased. Thus, the hard alloy powder is preferable in the range of from 2% to 30% by weight.

The graphite powder added to the mixed powder is dissolved to the matrix owing to heat during the sintering treatment to strengthen the matrix. A part of the graphite powder is diffused into the Ni-based hard particles to increase the hardness of Ni-based hard particles further and to improve wear-resistance.

When the graphite powder is less than 2%, improved effect isn't enough; when the graphite powder is more than 2%, the sintered material body is easy to be brittle. Thus, the graphite powder of the mixed powder is preferable in the range of from 0.2 to 2% by weight.

BRIEF DESCRIPTION OF THE DRAWINGS

A more complete appreciation of the present invention and many of its advantages will be readily obtained.

DETAILED DESCRIPTION OF THE PREFERRED EMBODIMENT

Figure 1:
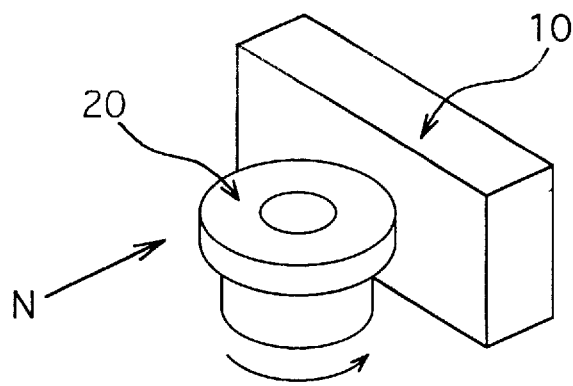
FIG. 1 is a perspective view of wear-resistance test.

A further understanding can be obtained by reference to the specific preferred embodiments.

Preferred Embodiment

Preferred embodiments will be hereinafter described with comparative examples. % exhibits weight %.

In the present embodiment, as for Fe-based alloy powder, Powder "a", Powder "c", Powder "d", and Powder "e" were prepared.

Powder "a" was a Fe-based atomized powder which includes 4.9% Mo, 4.6% Co, and the balance substantially of iron(Fe).

Powder "c" was a Fe-based atomized powder which includes 1.2% Mo, 4.7% Co, and the balance substantially of iron(Fe).

Powder "d" was a Fe-based atomized powder which includes 2.2% Mo, 4.6% Co, and the balance substantially of iron(Fe).

Powder "e" was a Fe-based atomized powder which includes 3.1% Mo, 4.5% Co, and the balance substantially of iron(Fe).

Each of Powder "a", Powder "d", and Powder "c" was to be constituted as the ferrous matrix corresponding to the aforementioned aspects 1 to 4. Powder "c" had less Mo than other powders for constituting the ferrous matrix corresponding to the aforementioned aspects 1 to 3.

The aforementioned Powder "a", Powder "c", Powder "d", and Powder "e" had a particle diameter of 177 micrometers or less respectively to pass through the meshes of 80 mesh-net.

Powder "b", working as hard particles powder constituting Ni-based hard particles, was prepared. This Powder "b" was Ni-based atomized alloy powder which includes 35.2% Cr, 12.5% W, 8.7% Mo, 18.7% Fe, 2.6% C, 0.6% Si, and the balance substantially of Ni. This Powder "b" had a particle diameter of 149 micrometers or less to pass through the meshes of 100 mesh-net.

Further, in the present embodiment, graphite powder, cerium fluoride powder ($CeF_3$) on the market, and zinc stearate powder working as a lubricant were prepared. It is observed under an observation by use of an electron microscope that Cerium fluoride powder has a flocculent state in which extremely minute pieces or extremely minute particles gather. The particle diameter of cerium fluoride powder generally varies depending on the separation of extremely minute pieces or particles. The cerium fluoride powder used in the present embodiment had a average particle diameter from 3 to 20 micrometers before mixing.

Each of Powders were weighed so as to be the composition shown in Table 1. Table 1 shows weight-ratios of each of Powders when the mixed powder is 100% except a lubricant to be vaporized owing to sintering. As appreciated from Table 1, as for the cerium fluoride powder, Embodiment Example 1 was 0.3%, Embodiment Example 2 was 9.5%, Embodiment Examples 3 and 4 were 5%, and Embodiment Example 5 was 14%. Also, as appreciated from Table 1, in each of Embodiment Examples and Comparative Examples, the graphite powder was 0.9%, and the lubricant was 0.8%.

Next, in a mixing step, each of Powders were uniformly mixed. After that, in a pressing step, the mixed powder was pressed in dies under a forming pressure of 620 MPa to produce a pressed compact body. In a sintering step, each of the pressed compact bodies was heated from a normal temperature to 1395 k in a nitrogen atmosphere for prevention of oxidation, so that each of the pressed compact bodies were sintered at 1395 k for 30 minutes to become each of specimens made of sintered material corresponding to Embodiment Examples 1 to 5.

Also, in Comparative Examples, Powders were weighed under the same conditions as those of the aforementioned Embodiment Examples. Moreover, the pressing step and the sintering step were carried out in the same way as that of Embodiment Examples in such a manner that specimens concerning Comparative Examples were produced.

Further, Table 2 shows the alloy composition concerning each of specimens when the sintered material body after sintering treatment is 100%. As appreciated from Table 2, as for the cerium fluoride powder, Embodiment Example 1 was 0.3%, Embodiment Example 2 was 9.5%, Embodiment Examples 3 and 4 were 5%, Embodiment Example 5 was 14%. Comparative Examples were free from cerium fluoride.

According to a structural observation by use of an optical microscope, the ferrous matrix concerning each of Embodiment Examples and Comparative Examples basically had a mixed structure in which Ni-rich austenite, bainite, pearlite, and ferrite were mixed.

For evaluating wear-resistance, "Ohkoshi wear-resistance test" was carried out with respect to the specimens concerning Embodiment Examples and with respect to the specimens concerning the Comparative Examples. In this wear-resistance test, as shown from FIG. 1, a specimen 10, namely a block, was fixed. Thereafter, a rotor 20 was pushed in the direction of arrow "N" to be pressed on the specimen 10 with the rotor 10 rotating. After this test, worn volume of the specimen 10 was measured. Conditions of this test was as follows:

Material of Rotor: JIS-SUH35
Block: Specimens of Embodiment Examples and Comparative Examples
Velocity of Slide: 0.40 m/sec
Frictional Distance: 100 m
Final Load: 27.5N
Test Temperature: Rotor; 773 k Block; 653K
Measurement Item: Worn Volume of Specimens Table 2 shows the worn volume of the blocks corresponding to the specimen as a relative ratio when the Comparative Example 2 is 100%. The smaller the relative ratio is, the smaller the worn volume is. This means improvement in wear-resistance. As shown from Table 2, Embodiment Example 1 was 84%, Embodiment Example 2 was 72%, Embodiment Example 3 was 89%, Embodiment Example 4 was 82%, and Embodiment Example 5 was 68%. In particular, Embodiment Example 3, including 1.8% Mo slightly, had a worn volume of 89% as a relative ratio to exhibit good result in wear resistance.

In this way, it is seen that Embodiment Examples 1 to 5 exhibited a small amount of relative wear amount to be improved in wear resistance. In particular, Embodiment Example 5, including a lot of cerium fluoride, was further improved in wear-resistance in spite of disadvantage in costs.

On the other hand, it is seen that Comparative Examples 1 to 4, including no cerium fluoride, exhibited a large amount of relative wear amount and that Comparative Examples 1 to 4 weren't advantageous in wear-resistance. That is, Comparative Example 1, including no cerium fluoride, exhibited 87% as a relative ratio of worn volume in spite of a considerable amount of Mo. Also, Comparative Example 3 exhibited 95%, and Comparative Example 4 exhibited 92%.

As appreciated from Table 1, both of Embodiment Example 1 and Comparative Example 1 utilized Powder"a" as a Fe-based alloy powder; so, both were similar in a powder-arranging ratio except cerium fluoride powder. Comparative Example 1 including no cerium fluoride exhibited 87% as a relative wear amount; Embodiment Example 1 including 0.3% cerium fluoride exhibited 84% as a relative wear amount to improve wear-resistance. Accordingly, it is thought that cerium fluoride is effective in wear-resistance even when the amount of cerium fluoride is small.

As appreciated from Table 1, both of Embodiment Example 3 and Comparable Example 2 utilized Powder"c" as the Fe-based alloy powder and both were similar in a powder-arranging ratio except cerium fluoride powder. Therefore, Embodiment Example 3 and Comparative Example 2 were similar in the molybdenum(Mo) content after the sintering treatment to be the similar composition except cerium fluoride. In spite of such, Comparative Example 2 having no cerium fluoride exhibited 100% as a relative wear amount not to improve wear-resistance; Embodiment Example 3 including 5% cerium fluoride exhibited 89% as a relative wear amount to improve wear-resistance.

As appreciated from: the composition shown in Table 2, both of Embodiment Example 3 and Embodiment Example 4 were similar in the basic composition and included 5% cerium fluoride. However, Embodiment Example 3 including 1.8% cerium fluoride slightly, exhibited 89% as a relative wear amount; Embodiment Example 4 including 3.3% cerium fluoride much exhibited 82% as a relative wear amount to improve wear-resistance. It is thought that Mo-based carbide affects wear-resistance.

Also, as appreciated from Table 2, Comparative Examples 2 to 4 were almost similar to each other in the basic composition except the Mo content. However, Comparative Example 2 including 1.8% Mo slightly exhibited 100% as a relative wear amount; Comparative Example 3 including 2.7% Mo exhibited 95% as a relative wear amount; Comparative Example 4 including 3.5% Mo exhibited 92% as a relative wear amount. Judging from only the Mo content, it is thought that improved effect in wear-resistance is stabilized in the range of above the neighborhood of 3% Mo.

By the way, according to the aforementioned sintered alloy disclosed in Japanese Unexamined Patent Publication (KOKAI) 62-202,058, the molten metal of Pb alloy for increasing lubricating ability is impregnated into the pores of the sintered body to be solidified. It is thought that Pb alloy is a substance has a bad influence to environment. Accordingly, it is preferable that Pb alloy isn't utilized and that the amount of Pb alloy is reduced as much as possible.

In this regard, in the aforementioned Embodiment Examples of the present inventions since wear-resistance was secured satisfactorily, cut or reduction of Pb alloy was advantageously carried out.

Also, according to each of Embodiment Examples whose composition was restricted as mentioned above, the wear-resistance of Fe-based matrix was advantageously ensured; further, corrosion-resistance and oxidation-resistance were advantageously ensured.

TABLE 1

| unit: | Fe-based alloy powder | | | | hard particle powder | $CeF_3$ | graphite | lubricant |
|---|---|---|---|---|---|---|---|---|
| wt. % | a | c | d | e | b | | | |
| embodiment ex. 1 | balance | — | — | — | 14 | 0.3 | 0.9 | 0.8 |
| embodiment ex. 2 | balance | — | — | — | 14 | 9.5 | 0.9 | 0.8 |
| embodiment ex. 3 | — | balance | — | — | 9 | 5 | 0.9 | 0.8 |
| embodiment ex. 4 | — | — | — | balance | 9 | 5 | 0.9 | 0.8 |
| embodiment ex. 5 | balance | — | — | — | 14 | 14 | 0.9 | 0.8 |
| comparative ex. 1 | balance | — | — | — | 14 | — | 0.9 | 0.8 |
| comparative ex. 2 | — | balance | — | — | 9 | — | 0.9 | 0.8 |
| comparative ex. 3 | — | — | balance | — | 9 | — | 0.9 | 0.8 |
| comparative ex. 4 | — | — | — | balance | 9 | — | 0.9 | 0.8 |

TABLE 2

| (:wt. %) | Co | Mo | Ni | Cr | W | C | Fe | $CeF_3$ | wear amount |
|---|---|---|---|---|---|---|---|---|---|
| embodiment ex. 1 | 4 | 5.5 | 3 | 4.9 | 1.8 | 1.3 | balance | 0.3 | 84% |
| embodiment ex. 2 | 3.6 | 4.6 | 3 | 4.9 | 1.8 | 1.3 | balance | 9.5 | 72% |
| embodiment ex. 3 | 3.9 | 1.8 | 2 | 3.2 | 1.1 | 1.1 | balance | 5 | 89% |
| embodiment ex. 4 | 3.7 | 3.3 | 2 | 3.2 | 1.1 | 1.1 | balance | 5 | 82% |
| embodiment ex. 5 | 3.4 | 4.8 | 3 | 4.9 | 1.8 | 1.3 | balance | 14 | 68% |
| comparative ex. 1 | 4 | 5.5 | 3 | 4.9 | 1.8 | 1.3 | balance | — | 87% |
| comparative ex. 2 | 4.1 | 1.8 | 2 | 3.2 | 1.1 | 1.1 | balance | — | 100% |
| comparative ex. 3 | 4 | 2.7 | 2 | 3.2 | 1.1 | 1.1 | balance | — | 95% |
| comparative ex. 4 | 3.9 | 3.5 | 3 | 3.2 | 1.1 | 1.1 | balance | — | 92% |

What is claimed is:

1. A powder-produced material having wear-resistance, said powder-produced material being characterized in that it comprises cerium fluoride, wherein said powder-produced material includes 1.4 to 15% by weight of cobalt (Co), 1.5 to 16% by weight of molybdenum (Mo), 0.4 to 12% by weight of chromium (Cr), 0.2 to 6% by weight of tungsten (W), 0.4 to 3.2% by weight of carbon (C), 0.2 to 9% by weight of nickel (Ni), 0.1 to 10.0% by weight of cerium fluoride ($CeF_3$), inevitable impurities, and the balance substantially of iron (Fe), based on the total weight of said powder-produced material.

2. A powder-produced material having wear-resistance, said powder-produced material being characterized in that it comprises a matrix including hard particles, wherein said matrix includes cerium fluoride, wherein said powder-produced material includes 1.4 to 15% by weight of cobalt (Co), 1.5 to 16% by weight of molybdenum (Mo), 0.4 to 12% by weight of chromium (Cr), 0.2 to 6% by weight of tungsten (W), 0.4 to 3.2% by weight of carbon (C), 0.2 to 9% by weight of nickel (Ni), 0.1 to 10.0% by weight of cerium fluoride ($CeF_3$), inevitable impurities, and the balance substantially of iron (Fe), based on the total weight of said powder-produced material.

3. A powder-produced material according to claim 2, wherein said hard particles is at least one selected from the group consisting of hard metallic particles, intermetallic compound particles, and ceramic particles.

4. A powder-produced material according to claim 2, wherein said hard particles is at least one selected from the group consisting of Ni-based hard particles, FeCr particles, FeMo particles, FeW particles, mullite particles, high-speed steel particles, and tool-steel particles.

5. A powder-produced material according to claim 2, wherein a particle diameter of said hard particles falls in the range of from at least one lower limit, being selected from the group consisting of 30 micrometers, 40 micrometers, and 50 micrometers, to at least one upper limit, being selected from the group consisting of 60 micrometers, 80 micrometers, and 100 micrometers.

6. A powder-produced material according to claim 2, wherein said hard particles are Ni-based hard particles,
said Ni-based hard particles include 5 to 20% by weight of molybdenum (Mo), 20 to 50% by weight of chromium (Cr), 10 to 25% by weight of tungsten (W), 0.5 to 5% by weight of carbon (C), 5 to 40% by weight of iron (Fe), inevitable impurities, and the balance substantially of nickel (Ni), based on the total weight of said Ni-based hard particles.

7. A powder-produced material according to claim 2, wherein said matrix is constituted from a ferrous matrix.

8. A powder-produced material according to claim 7, wherein said powder-produced material includes 1.4 to 15% by weight of cobalt (Co), 1.5 to 16% by weight of molybdenum (Mo), 0.4 to 12% by weight of chromium (Cr), 0.2 to 6% by weight of tungsten (W), 0.4 to 3.2% by weight of carbon (C), 0.2 to 9% by weight of nickel (Ni), 0.1 to 10.0% by weight of cerium fluoride (CeF$_3$), inevitable impurities, and the balance substantially of iron (Fe), based on the total weight of said powder-produced material;
said ferrous matrix includes 2 to 15% by weight of cobalt (Co), 2 to 10% by weight of molybdenum (Mo), 0.2 to 2% by weight of carbon (C), 10% or below by weight of nickel (Ni), inevitable impurities, and the balance substantially of iron (Fe), based on the total weight of said ferrous matrix;
said hard particles are Ni-based hard particles, said Ni-based hard particles include 5 to 20% by weight of molybdenum (Mo), 20 to 50% by weight of chromium (Cr), 10 to 25% by weight of tungsten (W), 0.5 to 5% by weight of carbon (C), 5 to 40% by weight of iron (Fe), inevitable impurities, and the balance substantially of nickel (Ni), based on the total weight of said Ni-based hard particles.

9. A powder-produced material according to claim 7, wherein said ferrous matrix is constituted from the structure comprising austenite.

10. A powder-produced material according to claim 7, wherein said ferrous matrix is constituted from a mixed structure where austenite, bainite, pearlite, and ferrite are mixed.

11. A powder-produced material according to claim 7, wherein said ferrous matrix includes 2 to 15% by weight of cobalt(Co), 2 to 10% by weight of molybdenum(Mo), 0.2 to 2% by weight of carbon(C), 10% or below by weight of nickel(Ni), inevitable impurities, and the balance substantially of iron(Fe), based on the total weight of said ferrous matrix.

* * * * *